US006061217A

United States Patent [19]

Grunert et al.

[11] Patent Number: 6,061,217

[45] Date of Patent: May 9, 2000

[54] ELECTRICAL SWITCHING APPARATUS EMPLOYING TWICE-ENERGIZED TRIP ACTUATOR

[75] Inventors: Kurt A. Grunert; William E. Beatty, both of Beaver; David H. Groves, North Sewickley; David M. Olszewski, McKees Rocks; James P. Ellsworth, Beaver; H. Richard Beck, Moon Township, all of Pa.; Jere L. McKee, Daytona Beach, Fla.

[73] Assignee: Eaton Corporation, Cleveland, Ohio

[21] Appl. No.: 08/991,731

[22] Filed: Dec. 16, 1997

[51] Int. Cl.$^{7}$ .................................................. H02H 3/00

[52] U.S. Cl. .................................................. 361/42; 335/38

[58] Field of Search .................................................. 361/42–50; 335/6, 335/13, 38, 39–41

[56] References Cited

U.S. PATENT DOCUMENTS

| | | | |
|---|---|---|---|
| 4,443,828 | 4/1984 | Legrand et al. | 361/93 |
| 4,503,408 | 3/1985 | Mrenna et al. | 335/35 |
| 4,528,531 | 7/1985 | Flick et al. | 335/23 |
| 4,553,115 | 11/1985 | Grunert et al. | 335/14 |
| 4,554,421 | 11/1985 | Grunert et al. | 200/43.15 |
| 4,606,313 | 8/1986 | Izumi et al. | 123/386 |
| 4,654,490 | 3/1987 | Leone et al. | 200/147 R |
| 4,683,451 | 7/1987 | Grunert et al. | 335/174 |
| 4,697,163 | 9/1987 | Grunert et al. | 335/174 |
| 4,713,639 | 12/1987 | Grunert et al. | 335/172 |
| 4,725,800 | 2/1988 | Grunert et al. | 335/38 |
| 4,743,875 | 5/1988 | Murphy | 335/18 |
| 4,887,057 | 12/1989 | Gula et al. | 335/190 |
| 4,973,928 | 11/1990 | Grunert | 335/38 |
| 5,200,724 | 4/1993 | Gula et al. | 335/166 |
| 5,224,006 | 6/1993 | MacKenzie et al. | 361/45 |
| 5,307,230 | 4/1994 | MacKenzie | 361/96 |
| 5,341,191 | 8/1994 | Crookston et al. | 335/16 |
| 5,886,860 | 3/1999 | Chen et al. | 361/9 |

*Primary Examiner*—Ronald W. Leja
*Attorney, Agent, or Firm*—Martin J. Moran

[57] ABSTRACT

A circuit breaker includes separable contacts for movement between a closed position and an open position to switch electrical current. An operating mechanism moves the separable contacts between the closed and open positions. A sensor senses the electrical current and outputs a sensed current signal corresponding to the electrical current. A shunt shunts a portion of the electrical current. A trip mechanism employs the sensed current signal to produce a trip signal. A trip actuator trips the operating mechanism to move the separable contacts to the open position. The trip actuator includes a trip solenoid having a coil energized by the trip signal and also includes one or more loops energized by the shunted portion of the electrical current.

29 Claims, 4 Drawing Sheets

FIG.4
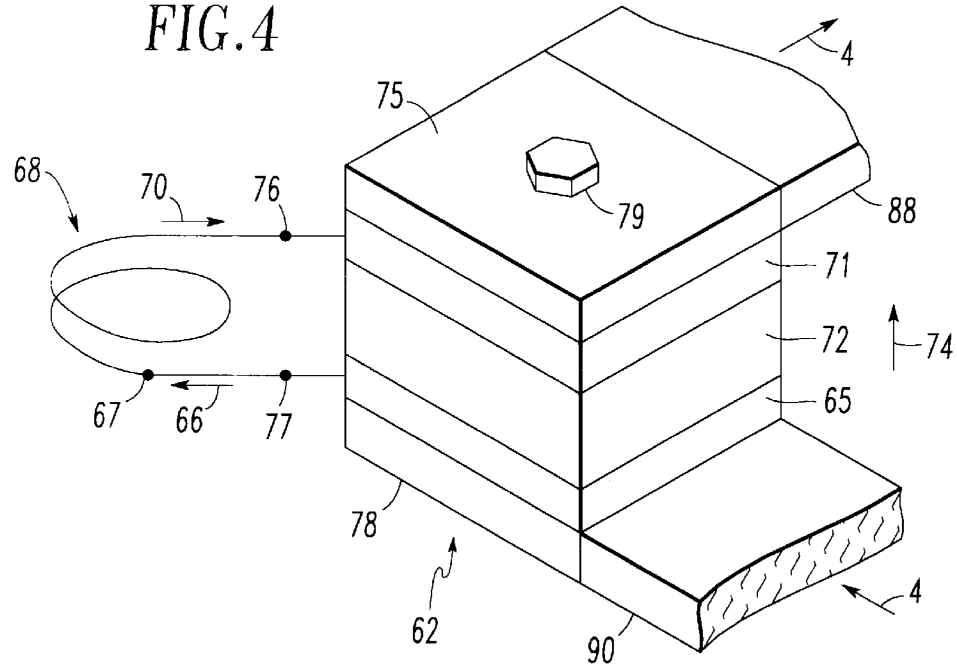
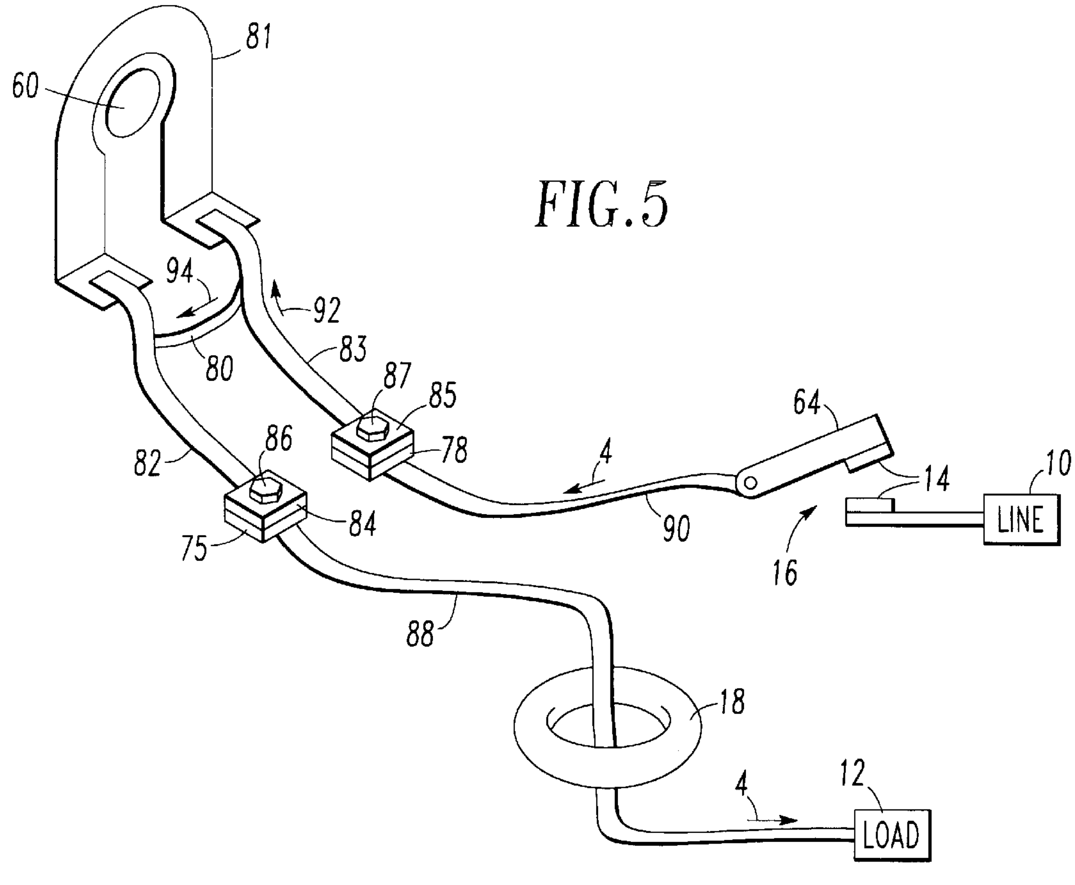
FIG.5

ELECTRICAL SWITCHING APPARATUS EMPLOYING TWICE-ENERGIZED TRIP ACTUATOR

BACKGROUND OF THE INVENTION

1. Field of the Invention

This invention is directed to an electrical switching apparatus and, more particularly, to a circuit interrupter, such as a circuit breaker, including a trip mechanism, and, most particularly, to a circuit breaker including an electromagnetic trip actuator.

2. Background Information

Electrical switching apparatus include, for example, circuit switching devices and circuit interrupters such as circuit breakers, contactors, motor starters, motor controllers and other load controllers. Circuit breakers are generally old and well known in the art. Examples of circuit breakers are disclosed in U.S. Pat. Nos. 4,528,531; 4,606,313; 4,887,057; 5,200,724; and 5,341,191. Such circuit breakers are used to protect electrical circuitry from damage due to an overcurrent condition, such as an overload condition or a relatively high level short circuit or fault condition.

Molded case circuit breakers include a pair of separable contacts per phase which may be operated either manually by way of a handle disposed on the outside of the case or automatically in response to an overcurrent condition. Typically, such circuit breakers include an operating mechanism, which is designed to rapidly open and close the separable contacts, and a trip mechanism, which senses overcurrent conditions in an automatic mode of operation. The trip mechanism causes a trigger mechanism or latch to release the operating mechanism thereby tripping open the separable contacts.

The function of a circuit breaker is to force the current in an electrical circuit to zero magnitude. In an electromechanical circuit breaker, for example, an electromagnetic trip actuator converts the electrical circuit current to a magnetic field and, hence, to a mechanical force. At a particular level of current, the trip actuator causes the trigger mechanism or latch to release the operating mechanism and trip open the separable contacts. The speed of this release action is key to successful and safe circuit interruption. With a faster release, the quantity of electrical energy that is seen by the electrical circuit and its components is reduced, thereby increasing the useful life of the circuit breaker.

Some types of circuit breakers include an electronic trip unit for automatically interrupting the current flow. Still other types of circuit breakers include an analog trip unit to automatically interrupt current flow.

Further types of circuit breakers employ a blow-open feature to assist the opening of the separable contacts, as there is an inherent time delay in the response of the trip mechanism and the operating mechanism to overcurrent conditions. The blow-open feature, in response to the very high magnetic repulsion forces generated by short circuit current flowing through the circuit breaker, permits a moveable contact arm to rotate independently of a carrier assembly of the operating mechanism. A slot motor, for example, may be employed to concentrate the magnetic field generated upon a relatively high level short circuit or fault condition to increase the magnetic repulsion forces between a rigid conductor on which a main contact is securely fastened and the movable contact arm. This rapidly accelerates the separation of the contacts and results in a relatively high arc resistance and, hence, limits the magnitude of the fault current.

In a direct current (DC) system, it is necessary to stretch the arc across the separable contacts to a point of instability by building up arc voltage via arc resistance. As the arc collapses, the cessation of the electrical circuit current begins. The gap or space between the parting separable contacts is essential to the process of interrupting a DC current. Likewise, the speed of parting of the separable contacts adds directly to the efficiency of the circuit interruption operation.

A somewhat similar situation occurs with alternating current (AC), except that there is a natural point of zero current at the end of the AC current pulse. The current limiting action is such as to force the current to zero magnitude ahead of the natural AC current pulse zero crossing. Again, the speed of the trip mechanism dictates the circuit interruption efficiency.

Some circuit breakers employ solid state sensors to detect the magnitude of the electrical circuit current for the purpose of trip control and other time related operations. These sensors are based on current pulse times and commonly utilize current transformers (CTs) which have polarity memories. The most recent electrical current being sensed by the CT often has to repolarize the CT's magnetic circuit before the sensed current signal's orientation is correct to permit the CT to begin proper sensing for the purpose of timing and trip initiation. Accordingly, the CT system is commonly "slow" to initiate the trip function in its own right. Typically, "slow" is in the general order of a ½ cycle delay (e.g., 8.3 ms in a 60 Hz circuit). Accordingly, there is room for improvement in the circuit interruption function of electrical switching apparatus.

SUMMARY OF THE INVENTION

This need and others are satisfied by the invention, which is directed to an electrical switching apparatus. The apparatus includes trip actuator means for tripping operating means to open separable contact means and switch an electrical current. A shunt means shunts a portion of the electrical current. The trip actuator means includes coil means energized by a trip signal and also includes at least one loop energized by the shunted portion of the electrical current. In this manner, the at least one loop, which is energized by the shunted current, improves the trip action time of the trip actuator means, while retaining conventional fixed or variable trip-time modes under overload conditions. At short circuit or fault level current magnitudes, the improved trip actuator means reduces the trip time of the apparatus.

The electrical switching apparatus comprises separable contact means for movement between a closed position and an open position in order to switch electrical current. An operating means for moving the separable contact means between the closed and open positions has a first position and a second position which corresponds to the open position. A sensing means senses the electrical current and outputs a sensed current signal corresponding to the electrical current, a trip means employs the sensed current signal to produce a trip signal, and a shunt means shunts a portion of the electrical current. A trip actuator means trips the operating means to the second position to move the separable contact means to the open position. The trip actuator means includes coil means for energization by the trip signal and also includes at least one loop energized by the portion of the electrical current.

As another aspect of the invention, an electrical switching apparatus comprises first terminal means for interconnection with a power source, second terminal means for interconnection with a load, separable contact means electrically interconnected between the first and second terminal means for movement between a closed position and an open position in order to switch electrical current, operating means for moving the separable contact means between the closed and open positions having a first position and a second position which corresponds to the open position, sensing means for sensing the electrical current having an output with a sensed current signal corresponding to the electrical current, and trip means. The trip means comprises digital trip means having an input interconnected with the output of the sensing means and employing the sensed current signal to produce a trip signal at an output, shunt means having an output for shunting a portion of the electrical current, and trip actuator means for tripping the operating means to the second position to move the separable contact means to the open position. The trip actuator means includes coil means having an input interconnected with the output of the digital trip means and also includes at least one loop with an input interconnected with the output of the shunt means.

As a further aspect of the invention, an electrical switching apparatus comprises separable contact means for movement between a closed position and an open position in order to switch electrical current; operating means for moving the separable contact means between the closed and open positions having a first position and a second position which corresponds to the open position; sensing means for sensing the electrical current and outputting a sensed current signal corresponding to the electrical current; trip means employing the sensed current signal for producing a trip signal; means for directing at least a portion of the electrical current to effect trip actuation; and trip actuator means for tripping the operating means to the second position to move the separable contact means to the open position. The trip actuator means includes an armature, coil means energized by the trip signal for driving the armature, and means employing the portion of the electrical current for coupling a magnetic field to the armature.

BRIEF DESCRIPTION OF THE DRAWINGS

A full understanding of the invention can be gained from the following description of the preferred embodiment when read in conjunction with the accompanying drawings in which:

FIG. 4 is a functional block diagram of the shunt of FIG. 3;

FIG. 5 is an isometric view of a shunt and a partial shunt turn in accordance with another embodiment of the invention.

DESCRIPTION OF THE PREFERRED EMBODIMENT

Figure 1:
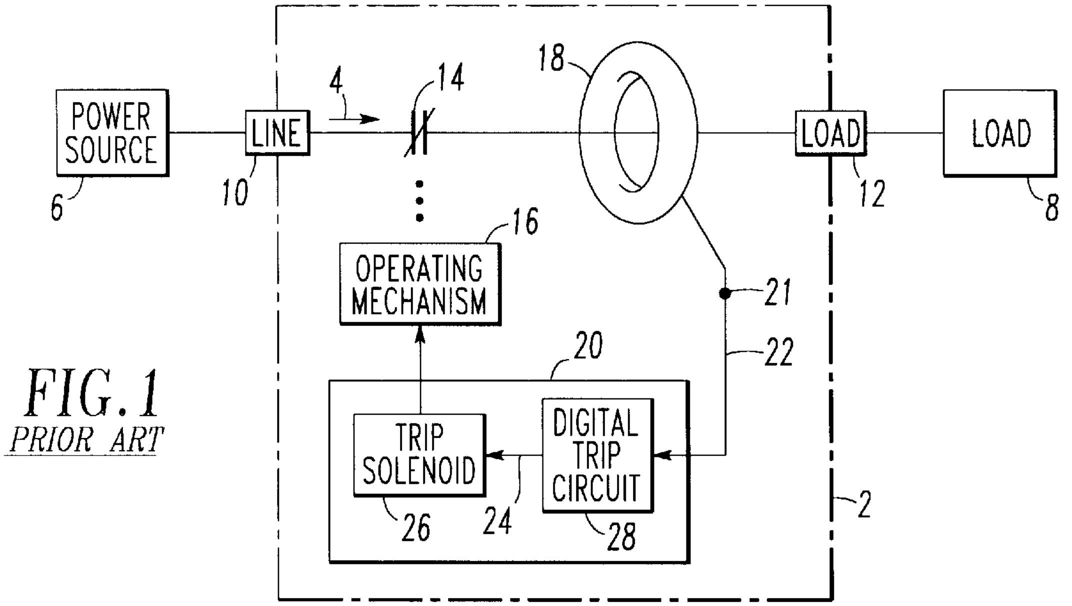
FIG. 1 PRIOR ART
FIG. 1 is a block diagram of a circuit breaker incorporating a conventional trip mechanism.

Referring to FIG. 1, a circuit breaker 2 for switching an electrical current 4 flowing between a power source 6 and a load 8 is illustrated. Typical examples of circuit breakers are disclosed in U.S. Pat. Nos. 4,503,408, 4,973,928 and 5,307,230, which are incorporated by reference herein. The circuit breaker 2 includes a line terminal 10 for interconnection with the power source 6, a load terminal 12 for interconnection with the load 8, separable contacts 14 electrically interconnected between the terminals 10,12 for movement between a closed position (as shown in FIG. 1) and an open position (not shown) in order to switch the electrical current 4, an operating mechanism 16 for moving the separable contacts 14 between the closed and open positions, a current transformer (CT) or sensor 18 for sensing the electrical current 4, and a trip mechanism 20.

The operating mechanism 16 has an open position (not shown) and a closed position (shown in FIG. 2) which corresponds to the closed position of the separable contacts 14. The sensor 18 has an output 21 with a sensed current signal 22 corresponding to the electrical current 4. The trip mechanism 20 employs the sensed current signal 22 to produce a trip signal 24. In turn, a trip actuator, such as trip solenoid 26, employs the trip signal 24 to trip the operating mechanism 16 to the open position thereof to move the separable contacts 14 to the open position thereof.

Figure 2:
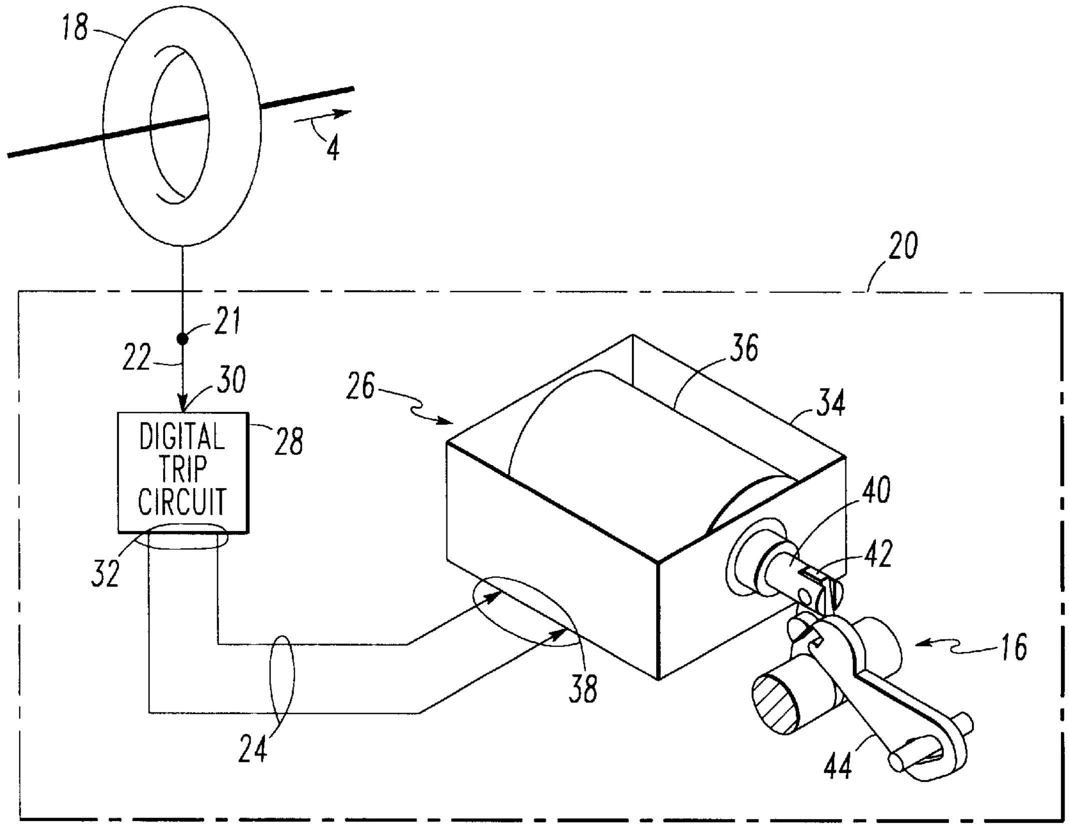
FIG. 2 PRIOR ART
FIG. 2 is a block diagram of the conventional trip mechanism of FIG. 1.

FIG. 2 illustrates the sensor 18 and the trip mechanism 20 of FIG. 1. The trip mechanism 20 has a solid state or digital trip circuit 28 having an input 30 interconnected with the output 21 of the sensor 18. The digital trip circuit 28 employs the sensed current signal 22 to produce the trip signal 24 at an output 32. The trip solenoid 26 includes a frame 34 which houses a coil 36 having an input 38 interconnected with the output 32 of the digital trip circuit 28. Whenever the coil 36 is energized by the trip signal 24, an armature 40 of the trip solenoid 26 is driven left (with respect to FIG. 2). In turn, the armature 40 pivots a delatch arm 42 counterclockwise (with respect to FIG. 2). The delatch arm 42 releases a latch 44 of the operating mechanism 16. Then, the latch 44, which is biased by a spring (not shown), pivots clockwise (with respect to FIG. 2). Hence, the operating mechanism 16 is released to the open position thereof which moves the separable contacts 14 to the open position thereof.

Figure 3:
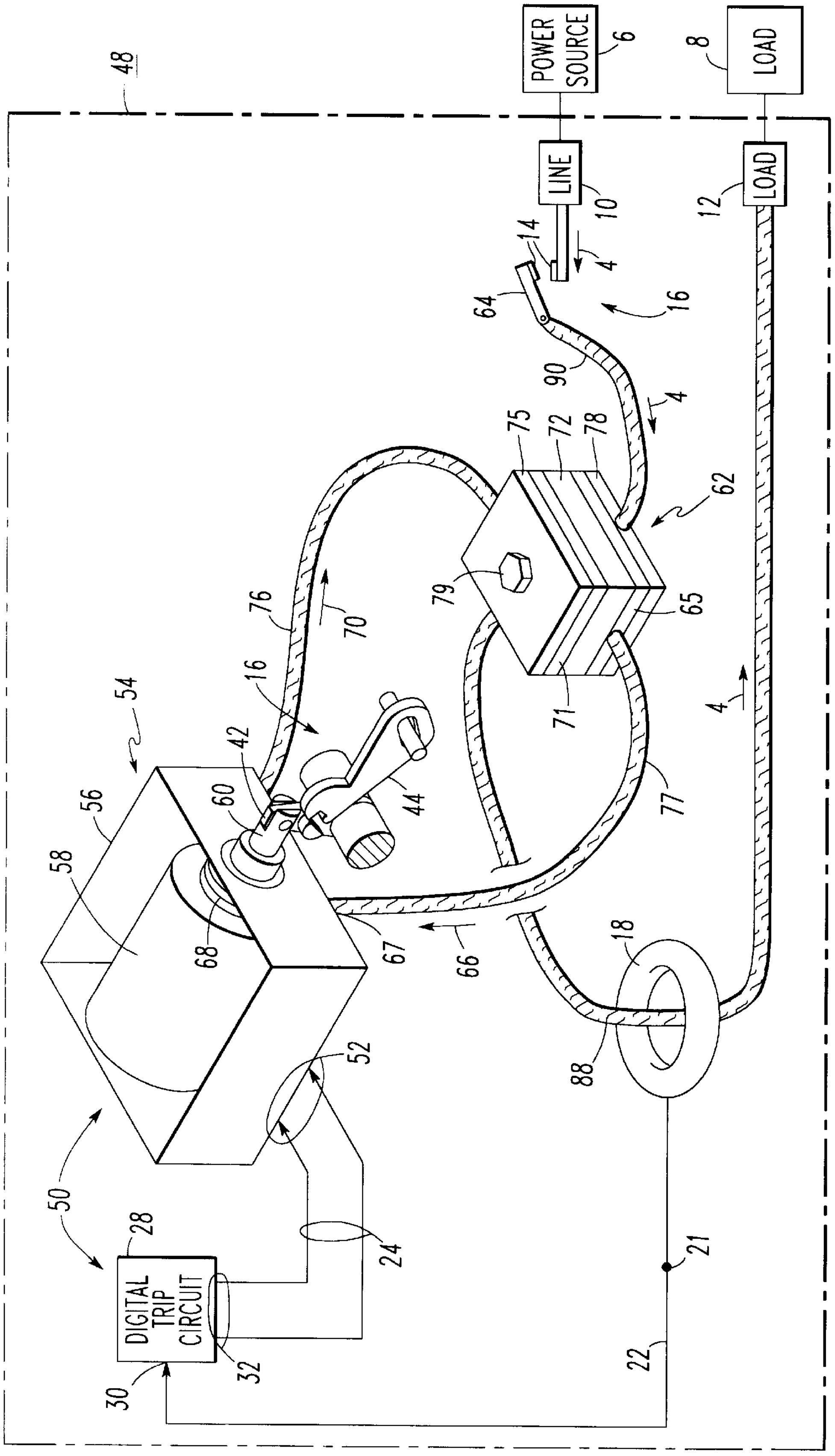
FIG. 3 is simplified block diagram of a circuit breaker having a trip actuator including an isometric view of a shunt in accordance with the present invention.

Referring to FIG. 3, a circuit breaker 48 including a trip mechanism 50 in accordance with the invention is illustrated. In a similar manner as discussed above with the trip solenoid 26 of FIG. 2, the exemplary trip mechanism 50 includes the digital trip circuit 28 which outputs the trip signal 24 to an input 52 of a trip solenoid 54. Although the exemplary trip solenoid 54 is illustrated, the invention is applicable to other types of trip actuators (e.g., a trip solenoid including a C-I delatch magnetic circuit having a clapper arm for engaging the operating mechanism 16; a magnetic frame, designed to actuate a trip member, suitable for accommodating an electrically isolated current carrying turn). The trip solenoid 54 includes a frame 56 which houses a coil 58. The coil 58 receives the trip signal 24 through the input 52 which is interconnected with the output 32 of the digital trip circuit 28.

In a similar manner as discussed above in connection with the trip solenoid 26 of FIG. 2, whenever the coil 58 is energized by the trip signal 24, an armature 60 of the trip solenoid 54 is driven left (with respect to FIG. 3). In turn, the armature 60 pivots the delatch arm 42 and releases the latch 44 of the operating mechanism 16, thereby releasing the operating mechanism 16 to its open position to open the separable contacts 14. A shunt 62 is disposed in the path of the electrical current 4 flowing between the line terminal 10, the separable contacts 14, a pivoting contact arm 64 (shown in its open position), and the load terminal 12.

Referring to FIGS. 3 and 4, the shunt 62 has an output or terminal 65 for directing a shunt current 66, which is at least a portion of the electrical current 4, to input 67 of one or more loops 68. The loops 68 effect trip actuation as explained below. The return current 70 from the loops 68 returns to an input or terminal 71 of the shunt 62. The shunt 62 also has a conductive portion 72 for conducting a non-shunt current 74, which is the remainder of the electrical current 4 that does not pass through the loops 68.

In this manner, the electrical current 4 from the contact arm 64 to the shunt 62 is divided into the shunt current 66 and the non-shunt current 74. Also, the electrical current 4 to the sensor 18 is the combination of the return current 70 and the non-shunt current 74. Preferably, in terms of minimizing power dissipation in the loops 68, the non-shunt current 74 (e.g., about 80% of the electrical current 4) is substantially greater than the shunt current 66 (e.g., about 20% of the electrical current 4) which is the same as the return current 70.

Continuing to refer to FIG. 3, the trip mechanism 50 effects trip actuation through the trip solenoid 54 in two different manners. First, under conventional trip operation, the coil 58 of the trip solenoid 54 is energized by the trip signal 24. Second, in accordance with the present invention, the loops 68, which are around the armature 60 of the trip solenoid 54, are energized by the shunt current 66 to couple a magnetic field to the armature 60. In turn, the armature 60 is driven left (with respect to FIG. 3) by the magnetic field from the loops 68 and improved trip operation is obtained as discussed below.

Preferably, in terms of maintaining similar ratings as that of the conventional circuit breaker 2 of FIG. 1, the percentage of the electrical current 4 to the loops 68 is set just above the magnitude whereby the separable contacts 14 would be driven open by the total electrical current 4, due to either or both of: (a) contact current repulsion, resulting from localized magnetic repulsion forces between the separable contacts 14; or (b) contact arm magnetic field force on the contact arm 64, which is similar to motor action. Either of these actions, without more, might not be sufficiently powerful to cause the complete opening of the contact arm 64. Hence, upon reclosing, the separable contacts 14 could actually weld closed due to the arc energy developed during the bounce time, while waiting for the trip to begin.

Preferably, the electrical current 4 has: (1) a first magnitude at a point of actuating the trip solenoid 54 by the loops 68 as energized by the shunt current 66; and (2) a second magnitude at a point of blow-open of the contact arm 64 and the separable contacts 14, with the first magnitude being about equal to the second magnitude. For example, the blow-open current limit of the exemplary contact arm 64 and the separable contacts 14 is about 40 times their rated current (e.g., 6000 A=40×150 A). When the electrical current 4 about equals the blow-open current limit, then the blow-open force resulting from such current overcomes the spring force holding the separable contacts 14 closed.

Referring again to FIGS. 3 and 4, the electrical current 4, after passing through the separable contacts 14 and the contact arm 64, is shunted into two paths. First, the shunt current 66 suitably energizes the loops 68 to drive the armature 60 under certain short circuit or fault current conditions. Second, the non-shunt current 74 is conducted through the conventional current path which does not pass through the loops 68. These two paths converge at input 71 of the shunt 62 before going through the sensor 18.

The sensor 18 senses the complete electrical current 4 and, at relatively low overload currents, operates in a timely and conventional fashion. However, as the fault current escalates, the loops 68 generate, immediately, enough ampere-turn magnetic force to drive the armature 60 of the trip solenoid 54 into relatively faster action. Therefore, the opening of the separable contacts 14 is started well before (e.g., ½ to 1 cycle) the sensor 18 and digital trip circuit 28 may separately and independently energize the coil 58 of the trip solenoid 54. Hence, the trip time is shorter, with a lower fault current magnitude, yet the improved trip mechanism 50 may be housed in essentially the same effective physical volume as that of a conventional circuit breaker.

The clearing time of the conventional circuit breaker 2 having the digital trip circuit 28 and trip solenoid 26 of FIG. 2 is typically between about 14.4 and about 20.2 ms (e.g., almost 2–3 60 Hz line half-cycles). For the exemplary trip mechanism 50, the improved clearing time is about 7.1 to about 12.2 ms (e.g., less than 1–2 60 Hz line half-cycles). This, on average, is about a 44% reduction of the clearing time of the conventional circuit breaker 2. With the magnitude of the peak let-through current also reduced, the arc structure is substantially cleaner and functionally ready for continued operation.

Still referring to FIGS. 3 and 4, the conductive portion 72 of the shunt 62 preferably is a conductive spacer, such as a block made of a suitable conductor (e.g., copper, tungsten, brass, steel). The shunt 62 and the loops 68 effect tripping at a first magnitude of the electrical current 4. The trip mechanism 50, including the digital trip circuit 28 and sensor 18, effect tripping at a second magnitude of the electrical current 4, which is less than the first magnitude. Preferably, the conductivity of the shunt 62 is selected as a function of the first magnitude of the electrical current 4.

As best shown in FIG. 4, the shunt 62 includes an upper terminal 75 connected to a flexible conductor 88, the terminal 71 connected to a flexible conductor 76 from the loops 68, the conductive spacer 72, the terminal 65 connected to a flexible conductor 77 to the loops 68, and a lower terminal 78 connected to a flexible conductor 90. The upper terminal 75, terminal 71, conductive spacer 72, terminal 65 and lower terminal 78 are secured by a fastener 79 therethrough as shown in FIG. 3.

Referring to FIG. 5, a shunt 80 and a partial shunt turn 81 are illustrated as alternative embodiments of the shunt 62 and the one or more loops 68, respectively, of FIGS. 3–4. Interconnected with the shunt 80 and the partial shunt turn 81 are conductors 82,83 and terminals 84,85. The terminals 84,85 are electrically connected to the terminals 75,78 by fasteners 86,87, respectively, although it will be appreciated that the terminals 84,85,75,78 and fasteners 86,87 may be eliminated with the conductors 83,90 and 82,88 being two conductors to and from the shunt turn 81.

In a similar manner as the shunt 62 and loops 68 of FIGS. 3–4, the terminal 84 is interconnected with the flexible conductor 88 such as a braided copper conductor, through the sensor 18 to the load terminal 12, and the terminal 85 is interconnected with the flexible conductor 90 to the contact arm 64. The shunt 80 directs a shunt current 92, which is at least a portion of the electrical current 4, to and through the partial shunt turn 81, which is employed around the armature 60 of the trip solenoid 54 of FIG. 3, to effect trip actuation. The return current from the partial shunt turn 81 is combined with non-shunt current 94, which is the remainder of the electrical current 4 that does not pass through such turn 81. The electrical current 4 from the contact arm 64 to the shunt 80 is divided into the shunt current 92 and the non-shunt current 94, with the electrical current 4 to the sensor 18 being the combination of the currents 92,94. Preferably, in terms of minimizing power dissipation in the partial shunt turn 81, the non-shunt current 94 (e.g., about 80% of the electrical current 4) is substantially greater than the shunt current 92 (e.g., about 20% of the electrical current 4).

Preferably, in terms of minimizing the size of the partial shunt turn 81 for use with the trip solenoid 54 of FIG. 3 to drive the armature 60 thereof, the turn 81 is made of metal copper, although a variety of other conductors may be employed (e.g., a braid made of copper, a solid strip or braid made of aluminum, copper coated steel, brass). In terms of minimizing the effects of mechanic a shock, the shunt 80 and conductors 82,83 are braids, such as copper, although other conductors may be employed (e.g., aluminum, copper coated steel, brass). If braids are employed, the electrical connections between the terminals 84,85, the conductors 82,83, the shunt 80 and the partial shunt turn 81 are provided by compressing the ends of a braid (e.g., the ends of the conductor 83) before soldering it to other components (e.g., terminal 85 and the right leg of turn 81).

The exemplary partial shunt turn 81 employs less than one turn in conjunction with the shunt current 92 to couple a magnetic field to the armature 60 of the trip solenoid 54 of FIG. 3, although the invention is applicable to other shunt turns or loops having one or more loops as shown in FIGS. 3 and 4. While the partial shunt turn 81 and the one or more loops 68 have been illustrated in conjunction with the exemplary shunts 80 and 62, respectively, for shunting a portion of the electrical current 4, it will be appreciated that any suitable circuit which employs at least a portion or all (e.g., for a maximum force effect) of the electrical current 4 to couple a magnetic field to the armature of a trip actuator may be employed.

Instead of solely employing the main electrical current 4 through sensor 18 and translating the same to solenoid action by means of the digital trip circuit 28 of FIG. 2 for actuating the trip function, the improved trip mechanism 50 provides earlier trip actuation. The exemplary one or more loops 68 of FIGS. 3–4 and the partial shunt turn 81 of FIG. 5 direct at least a portion of the electrical current 4 to effect trip actuation. Operation of the improved trip mechanism 50 allows the action time of the operating mechanism 16 to be decreased, substantially, particularly as compared to electronic sensing devices. The trip solenoid 54 retains its conventional fixed or variable trip-time modes through the overload current range. However, at short circuit or fault current magnitudes, the improved trip mechanism 50 multiplies the effort, with reduction in trip time, of the operating trip solenoid 54.

Figure 6:
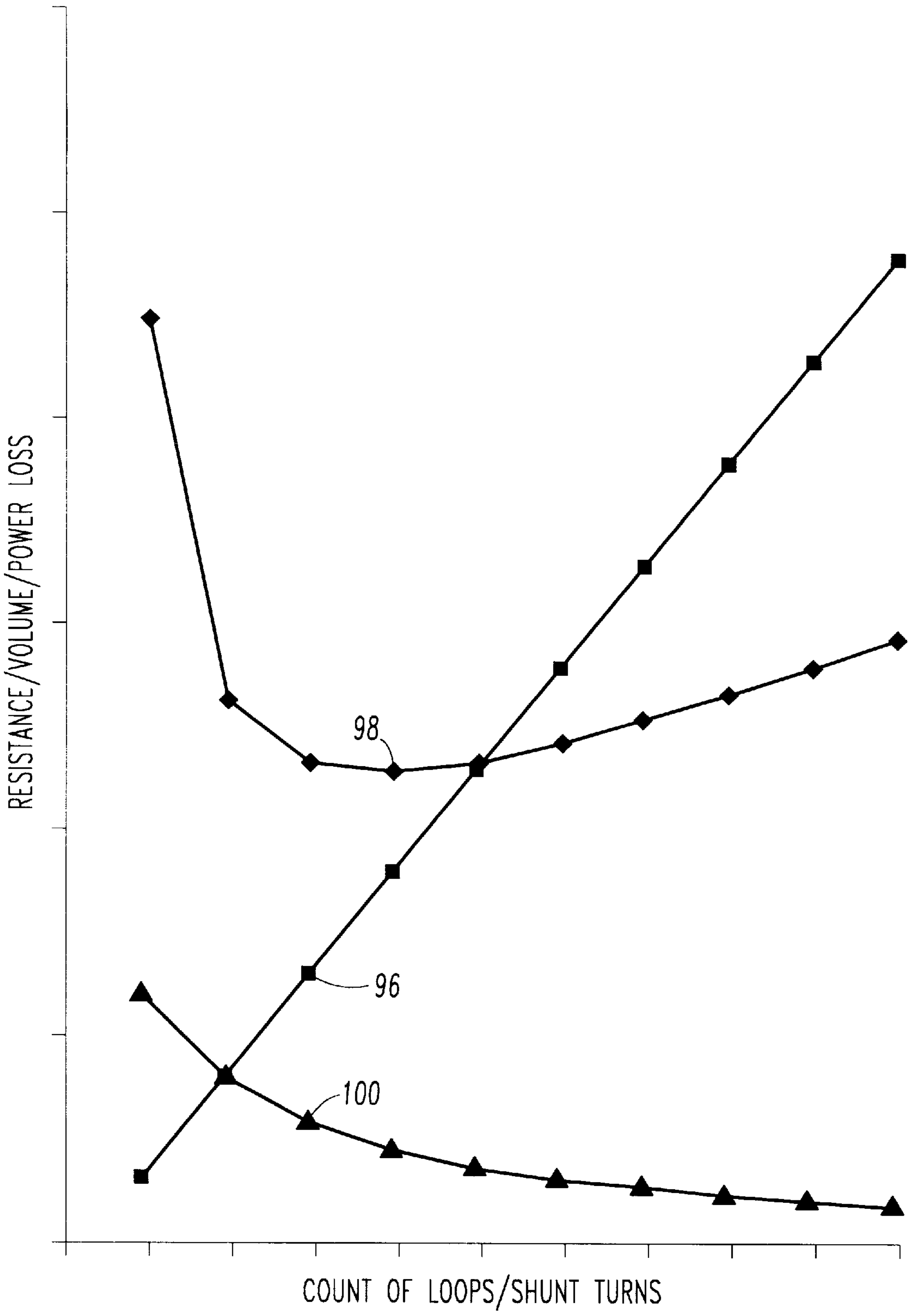
FIG. 6 is a plot illustrating the relationship between resistance, volume, power loss, and the count of loops or shunt turns in accordance with the present invention.

FIG. 6 illustrates plots 96, 98 and 100 which respectively show the relationship between resistance, volume and power loss plotted on the Y-axis versus a count of loops or shunt turns plotted on the X-axis. The resistance plot 96 shows that the resistance of the solenoid loops or shunt turns increases linearly with the count thereof, while the power loss plot 100 shows that power lost in the solenoid loops or shunt turns decreases at an exponentially decreasing rate with such count. As shown with the volume plot 98, the volume of the solenoid loops or shunt turns is preferably minimized, in terms of the space constraints within a circuit breaker, with the exemplary count of four loops or shunt turns.

Although the exemplary embodiments illustrate shunts 62,80, and the partial shunt turn 81 or one or more loops 68 for a single phase (e.g., a single phase system, phase B of a three-phase A,B,C system), it will be appreciated that such circuitry may be employed with two or more phases (e.g., phases B,C; A,B,C) in a plural-phase (e.g., three-phase A,B,C) system.

In the exemplary embodiments, if the fault current condition occurs on a positive AC half-cycle of the electrical current 4, then the partial shunt turn 81 or loops 68 employ such current to couple a magnetic field to the armature 60 of the trip solenoid 54 and positively reinforce the trip signal 24 which energizes the coil 58 of the trip solenoid 54. Alternatively, for a fault current condition occurring on the negative AC half-cycle, there is a negligible change in the trip response of the trip solenoid 54 as energized by the trip signal 24. Nevertheless, there is a statistical improvement in the operation of the trip mechanism 50 in tripping open the separable contacts 16. Preferably, where sufficient circuit breaker space is available, a shunt and an insulated partial shunt turn or one or more insulated loops are employed for each of the phases of a plural-phase system. In this manner, regardless whether the fault current condition occurs on positive or negative AC half-cycles, the trip signal 24 is positively reinforced.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An electrical switching apparatus for switching an electrical current, said electrical switching apparatus comprising:

separable contact means for movement between a closed position and an open position in order to switch said electrical current;

operating means for moving said separable contact means between the closed position and the open position thereof, said operating means having a first position and a second position which corresponds to the open position of said separable contact means;

sensing means for sensing said electrical current and outputting a sensed current signal corresponding to said electrical current;

trip means employing the sensed current signal for producing a trip signal;

shunt means for continuously shunting only a portion of said electrical current; and trip actuator means for tripping said operating means to the second position thereof to move said separable contact means to the open position thereof, said trip actuator means including coil means for energization by the trip signal and also including at least one loop energized by the portion of said electrical current.

2. The electrical switching apparatus as recited in claim 1 wherein said coil means is a trip solenoid.

3. The electrical switching apparatus as recited in claim 2 wherein said trip means comprises digital trip means having a digital output; and wherein the trip solenoid is energized by the digital output.

4. The electrical switching apparatus as recited in claim 1 wherein said at least one loop is one loop.

5. The electrical switching apparatus as recited in claim 1 wherein said at least one loop is a plurality of loops.

6. The electrical switching apparatus as recited in claim 2 wherein the trip solenoid includes an armature driven by the portion of said electrical current in said at least one loop; and wherein said armature trips said operating means.

7. The electrical switching apparatus as recited in claim 1 wherein said electrical current has a first magnitude at a point of actuating said trip actuator means by said at least one loop energized by the portion of said electrical current; wherein said electrical current has a second magnitude at a point of blow-open of said separable contact means; and wherein the first magnitude is about equal to the second magnitude.

8. The electrical switching apparatus as recited in claim 7 wherein said shunt means has a conductivity which is selected as a function of the first magnitude of said electrical current.

9. The electrical switching apparatus as recited in claim 1 wherein said shunt means includes a conductive spacer.

10. The electrical switching apparatus as recited in claim 1 wherein said shunt means includes a flexible conductor.

11. The electrical switching apparatus as recited in claim 10 wherein the flexible conductor is a braided copper conductor.

12. The electrical switching apparatus as recited in claim 1 wherein said shunt means and said at least one loop effect tripping at a first magnitude of said electrical current; and wherein said trip means effects tripping at a second magnitude of said electrical current, with the second magnitude of said electrical current being less than the first magnitude of said electrical current.

13. The electrical switching apparatus as recited in claim 1 wherein said electrical current has a first magnitude at a point of actuating said trip actuator means by said at least one loop energized by the portion of said electrical current; and wherein the portion of said electrical current has a second magnitude which is less than the first magnitude.

14. An electrical switching apparatus for switching an electrical current flowing between a power source and a load, said electrical switching apparatus comprising:

first terminal means for interconnection with said power source;

second terminal means for interconnection with said load;

separable contact means electrically interconnected between said first and second terminal means for movement between a closed position and an open position in order to switch said electrical current;

operating means for moving said separable contact means between the closed position and the open position thereof, said operating means having a first position and a second position which corresponds to the open position of said separable contact means;

sensing means for sensing said electrical current, said sensing means having an output with a sensed current signal corresponding to said electrical current; and trip means comprising:

digital trip means having an input interconnected with the output of said sensing means, said digital trip means employing the sensed current signal to produce a trip signal at an output, shunt means having an output for continuously shunting only a portion of said electrical current, and trip actuator means for tripping said operating means to the second position thereof to move said separable contact means to the open position thereof, said trip actuator means including coil means having an input interconnected with the output of the digital trip means and also including at least one loop with an input interconnected with the output of the shunt means.

15. The electrical switching apparatus as recited in claim 14 wherein said coil means is a trip solenoid.

16. The electrical switching apparatus as recited in claim 15 wherein the trip solenoid includes an armature driven by the portion of said electrical current in said at least one loop.

17. The electrical switching apparatus as recited in claim 14 wherein said electrical current has a first magnitude at a point of actuating said trip actuator means by said at least one loop energized by the portion of said electrical current; wherein said electrical current has a second magnitude at a point of blow-open of said separable contact means; and wherein the first magnitude is about equal to the second magnitude.

18. The electrical switching apparatus as recited in claim 14 wherein said shunt means and said at least one loop effect tripping at a first magnitude of said electrical current; and wherein the digital trip means interconnected with said sensing means effect tripping at a second magnitude of said electrical current, with the second magnitude of said electrical current being less than the first magnitude of said electrical current.

19. The electrical switching apparatus as recited in claim 14 wherein said electrical current has a first magnitude at a point of actuating said trip actuator means by said at least one loop energized by the portion of said electrical current; and wherein the portion of said electrical current has a second magnitude which is about 20% of the first magnitude.

20. An electrical switching apparatus for switching an electrical current, said electrical switching apparatus comprising:

separable contact means for movement between a closed position and an open position in order to switch said electrical current;

operating means for moving said separable contact means between the closed position and the open position thereof, said operating means having a first position and a second position which corresponds to the open position of said separable contact means;

sensing means for sensing said electrical current and outputting a sensed current signal corresponding to said electrical current;

trip means employing the sensed current signal for producing a trip signal;

means for continuously directing only at portion of said electrical current to effect trip actuation; and trip actuator means for tripping said operating means to the second position thereof to move said separable contact means to the open position thereof, said trip actuator means including an armature, coil means energized by the trip signal for driving the armature, and means employing said portion of said electrical current for coupling a magnetic field to the armature.

21. The electrical switching apparatus as recited in claim 20 wherein said means for directing directs said electrical current to effect trip actuation; and wherein said means employing said portion of said electrical current comprises at least a portion of one loop energized by said electrical current.

22. The electrical switching apparatus as recited in claim 21 wherein said at least a portion of one loop is a portion of one loop.

23. The electrical switching apparatus as recited in claim 21 wherein said at least a portion of one loop is one or more loops.

24. The electrical switching apparatus as recited in claim 20 wherein said means employing said portion of said electrical current comprises at least one loop energized by said portion of said electrical current.

25. The electrical switching apparatus as recited in claim 24 wherein said at least one loop is one loop.

26. The electrical switching apparatus as recited in claim 24 wherein said at least one loop is a plurality of loops.

27. The electrical switching apparatus as recited in claim 20 wherein said means employing said portion of said electrical current comprises at least a portion of one loop energized by said portion of said electrical current.

28. An electrical switching apparatus for switching an electrical current, said electrical switching apparatus comprising:

separable contact means for movement between a closed position and an open position in order to switch said electrical current;

operating moans for moving said separable contact means between the closed position and the open position thereof, said operating means having a first position and a second position which corresponds to the open position of said separable contact means;

sensing means for sensing said electrical current and outputting a sensed current signal corresponding to said electrical current;

trip means employing the sensed current signal for producing a trip signal;

shunt means for shunting a portion of said electrical current; and trip actuator means for tripping said operating means to the second position thereof to move said separable contact means to the open position thereof, said trip actuator means including coil means for energization by the trip signal and also including at least one loop energized by the portion of said electrical current, wherein said electrical current has a first magnitude at a point of actuating said trip actuator means by said at least one loop energized by the portion of said electrical current, wherein said electrical current has a second magnitude at a point of blow-open of said separable contact means, and wherein the first magnitude is about equal to the second magnitude.

29. An electrical switching apparatus for switching an electrical current flowing between a power source and a load, said electrical switching apparatus comprising:

first teal means for interconnection with said power source;

second terminal means for interconnection with said load;

separable contact means electrically interconnected between said first and second terminal means for movement between a closed position and an open position in order to switch said electrical current;

operating means for moving said separable contact means between the closed position and the open position thereof, said operating means having a first position and a second position which corresponds to the open position of said separable contact means;

sensing means for sensing said electrical current, said sensing means having an output with a sensed current signal corresponding to said electrical current; and trip means comprising:

digital trip means having an input interconnected with the output of said sensing means, said digital trip means employing the sensed current signal to produce a trip signal at an output, shunt means having an output for shunting a portion of said electrical current, and trip actuator means for tripping said operating means to the second position thereof to move said separable contact means to the open position thereof, said trip actuator means including coil means having an input interconnected with the output of the digital trip means and also including at least one loop with an input interconnected with the output of the shunt means, wherein said electrical current has a first magnitude at a point of actuating said trip actuator means by said at least one loop energized by the portion of said electrical current, wherein said electrical current has a second magnitude at a point of blow-open of said separable contact means, and wherein the first magnitude is about equal to the second magnitude.

* * * * *